(12) United States Patent
Terk

(10) Patent No.: US 6,865,193 B2
(45) Date of Patent: Mar. 8, 2005

(54) VIDEO TRANSMISSION SYSTEM AND METHOD UTILIZING PHONE LINES IN MULTIPLE UNIT DWELLINGS

(76) Inventor: Neil D. Terk, One Vista Dr., Laurel Hollow, NY (US) 11791

(*) Notice: Subject to any disclaimer, the term of this patent is extended or adjusted under 35 U.S.C. 154(b) by 612 days.

(21) Appl. No.: 09/954,380

(22) Filed: Sep. 17, 2001

(65) Prior Publication Data
US 2002/0021716 A1 Feb. 21, 2002

Related U.S. Application Data

(63) Continuation of application No. 09/255,295, filed on Feb. 22, 1999, now abandoned.

(51) Int. Cl.[7] .................................................. H04L 5/06
(52) U.S. Cl. .................................... 370/493; 379/90.01
(58) Field of Search ................................ 370/486, 493, 370/494, 495; 379/90.01, 93.05, 93.09

(56) References Cited

U.S. PATENT DOCUMENTS

| | | | |
|---|---|---|---|
| 3,590,152 A | 6/1971 | McDonald | |
| 3,683,111 A | 8/1972 | Southworth | |
| 4,302,629 A | 11/1981 | Foulkes et al. | |
| 4,330,687 A | 5/1982 | Foulkes et al. | |
| 4,387,271 A | 6/1983 | Artom | |
| 4,425,642 A | 1/1984 | Moses et al. | |
| 4,449,218 A | 5/1984 | Strehl | |
| 4,766,402 A | 8/1988 | Crane | |
| 4,785,448 A | 11/1988 | Reichert et al. | |
| 4,807,225 A | 2/1989 | Fitch | |
| 4,849,811 A | 7/1989 | Kleinerman | |
| 5,003,579 A | 3/1991 | Jones | |
| 5,010,399 A | 4/1991 | Goodman et al. | |
| 5,036,513 A | 7/1991 | Greenblatt | |
| 5,051,822 A | 9/1991 | Rhoades | |
| 5,065,425 A | 11/1991 | Lecomte et al. | |
| 5,125,026 A | 6/1992 | Holcombe | |
| 5,136,586 A | 8/1992 | Greenblatt | |
| 5,173,934 A | 12/1992 | Marquet et al. | |
| 5,214,422 A | 5/1993 | Cullimore | |
| 5,299,264 A | 3/1994 | Schotz et al. | |
| 5,410,343 A | * 4/1995 | Coddington et al. | .......... 725/99 |
| 5,528,281 A | 6/1996 | Grady et al. | |
| 5,844,596 A | 12/1998 | Goodman | |
| 5,929,896 A | 7/1999 | Goodman et al. | |

FOREIGN PATENT DOCUMENTS

| | | |
|---|---|---|
| DE | 2051 647 | 5/1971 |
| DE | 20 03 980 | 8/1971 |
| DE | 21 61 077 | 7/1972 |
| DE | 2226614 C3 | 12/1972 |
| DE | 2223 410 | 2/1973 |
| DE | 28 29 667 | 5/1979 |
| DE | 30 22 359 | 1/1981 |
| DE | 2305094 C2 | 4/1982 |
| EP | 0 010 813 | 5/1980 |
| EP | 0 204 450 | 12/1986 |
| EP | 0 244 260 A2 | 11/1987 |
| FR | 2159160 | 11/1971 |
| FR | 2336017 | 12/1975 |
| FR | 2 530 394 | 7/1982 |
| GB | 2 137 843 A | 10/1984 |
| JP | 1498127 | 1/1978 |
| WO | WO 90/04 306 | 4/1990 |

* cited by examiner

Primary Examiner—Melvin Marcelo
(74) Attorney, Agent, or Firm—Gerald T. Bodner

(57) ABSTRACT

Video programming signals from a broadband source are distributed on installed telephone wiring to the individual units of a commercial structure or multiple unit dwelling. In all methods and associated devices a first transponder device centrally located in a utility space is paired with a second terminal transponder device located on a telephone subscriber premises. The devices cooperate in converting a video signal into a form suitable for transmission on telephone lines and deconverting that signal into a form suitable for reception by consumer video equipment. The methods and devices discussed differ in placement of the central device, and in the particular method of signal conversion.

10 Claims, 8 Drawing Sheets

VIDEO TRANSMISSION SYSTEM AND METHOD UTILIZING PHONE LINES IN MULTIPLE UNIT DWELLINGS

This is a continuation of Application Ser. No. 09/255,295, filed Feb. 22, 1999, now abandoned.

FIELD OF THE INVENTION

This invention relates to a video distribution system and to a related method. More particularly, this invention relates to such a system and method which are useful in multiple unit dwellings.

BACKGROUND OF THE INVENTION

It is well known that 'cable' television has largely supplanted broadcast television as the preferred real-time video signal distribution method of choice in the modern home. Compared to broadcast technology, cable distribution offers superior protection against signal degradation and greater available bandwidth. Consumers have expressed a clear preference for programming quantity and variety, and the demand for large channel menus seems likely to persist.

Video signals arriving at a multiple dwelling unit building, either by feeder cable or satellite dish or some other source, are advantageously distributed by a local network of coaxial cable terminating in each dwelling unit. These cables provide good shielding, both from outside sources of interference and from interference from the cable signals themselves with broadcast reception. Concurrently, coaxial cables provide low loss characteristics. This technically sound distribution scheme is not without disadvantages, however. Wiring a building for cable entails a considerable labor expense, and, depending on the care of the installers, a more or less intrusive presence of cables or molding in public hallways, and in some cases, even dangling from the outsides of buildings. Even when such an installation is already in place, regulations generally leave the cable installer, typically the local cable franchise, in monopoly possession of rights to use the local area network. Although this situation may change in the future, in parallel with current trends in electrical distribution and phone networks, at present landlords or cooperative tenants face serious legal difficulties attempting to distribute alternative source signals over proprietary cables. Circumventing this problem by installing a second independent cable distribution network in the same structure is clearly a less than appealing solution.

Hence there exists a clear need for alternative means of distributing video signals within multiple dwelling unit structures. An alternative distribution means is required to provide each unit or apartment with access to a large number of channels, typically between 50 and 100, with acceptable signal to noise ratio, and freedom from interference both to and from outside sources. The two general possibilities which present themselves, if a specialized network is not to be installed, are low-power broadcasting and use of an existing network of conducting paths. The former is generally ruled out because of interference and FCC regulation, although low-power broadcast devices are known to have been have been marketed for related purposes in direct contravention of regulation. Pondering the alternative of using pre-installed wiring, the technician will discover conductive paths in almost all existing structures, having terminations in every room or at least every unit, potentially including plumbing, power distribution wiring, and telephone wiring. No attempts are known to the inventor to use plumbing as a transmission medium, which plan would clearly present formidable difficulties. Telephone and power systems have not been designed for video signal transmission, but at least have been designed for providing electrically conductive paths. Appliances, however, are known to inject broadband RF energy into power lines, defeating efforts to utilize empty bandwidth above 50 Hz or 60 Hz alternating current. The present invention utilizes telephone lines as a transmission medium.

Telephone wires entail their own technical and regulatory problems as a medium for the transmission of video signals. As signal media, telephone lines represent an obsolescent system not designed to efficiently transmit RF (radio frequency) information, which for the purposes of the present invention essentially means all signals with frequency components above an audio baseband range, i.e. above approximately 4 kHz.

Analog phone lines concentrate most voice information below 4 kHz. Clearly, this band must be left unmolested to avoid interference with voice communications. Regulation imposes more stringent spectral requirements, however, limiting the amount of RF energy below 6 MHZ that may be injected into the public telephone network. Therefore the most conservative systems contemplating the injection of auxiliary carrier signals into phone wiring will not trespass on this band. Further problems arise from the fact that telephone wiring was not designed for radio frequency transmission. Telephone wiring lacks grounded shielding, which gives rise to further technical and legal problems. In particular, an unshielded conductor functions as an antenna. On the transmission side, this means the wires carrying RF signals radiate significant electromagnetic energy, resulting in signal attenuation. Boosting the signal will increase the maximum useful length of RF signal transmission on the wire, but simultaneously increase broadcast power and possibly cause interference to other devices, or run afoul of FCC radiation limits. Conversely, on the reception side, lack of shielding makes the system vulnerable to outside sources of interference. Maximum usable bandwidth similarly presents a trade-off between increasing utilization of the RF spectrum, and the increased radiation and attenuation at higher frequencies; signal loss through radiation being a monotonically increasing function of frequency. In general the problem of non-design utilization of unused transmission capacity in local area phone networks is one of choosing a power transmission spectrum extremizing an objective function weighted by both total information throughput and cost, and subject to technical and regulatory constraints on unintended interference with other devices. It is known as a practical matter that the solution to this optimization problem allows transmission of a small number of video channels, typically 2 or 3, across a single active telephone wiring pair, a number far lower than the number of program sources a consumer expects to be able to receive on demand. This design problem too must be overcome.

In the future, new structures will undoubtably be built with efficient broadband local area networks in place. Information distribution will be seen as a routine utility function, much as water, gas, sewer, power and phone hook ups are viewed today. For the near future, however, there will remain a strong demand to squeeze or piggy-back extra signals onto existing wiring, in cases where the economics can justify this approach over installing new local area networks. The problems to be overcome in this approach are outlined above, and the solution must thread between the twin hazards of unintended RF transmission and unacceptable signal degradation, at acceptable cost.

Extensive investigation into these problems is disclosed by Goodman et al. (U.S. Pat. No. 5,010,399), in which other prior art is also reviewed. However, the system disclosed by Goodman is adapted for installation in a single extended dwelling unit, such as a single family home, wherein a small number of single channel video sources and TV receivers are distributed. It is not obvious how to extend or adapt this household system to a multiple unit dwelling, where typically a single broadband source is to be simultaneously made available in its entirety at many remote locations.

OBJECTS OF THE INVENTION,

It is an object of this invention to provide a novel method of distributing radio frequency signals to the separate units of a multiple dwelling unit structure or commercial building.

It is a more particular object of this invention to provide a means of distributing video or data signals to multiple units of an existing structure without the expense of installing a dedicated cable network.

It is yet a further object of the present invention to provide a means of signal distribution providing each unit in an existing structure with at least one of a plurality of video channels on demand.

These and other objects of the present invention will be apparent from the drawings and descriptions therein.

SUMMARY OF THE INVENTION

A common multiple channel video source is disposed in a utility space of a multiple dwelling unit or small commercial structure. Typically, this source will output on the order of 100 channels of simultaneous video programming. One or preferably several of these channels are to be available on demand at a number of terminal locations inside the structure, one or more of these terminals being located in each dwelling unit or unit of commercial space. Preferably, the video source will be located adjacent to a central telephone service location, such as a basement 'telephone closet'. Alternatively, the source may be located at some distance from such a telephone service location, and the full information content of the source be made available at the telephone service location by a dedicated wide-band transmission medium, such as a coaxial cable. It is desired to relay selected video programming signals to the terminal locations by using pre-installed, active, telephone wiring pairs. Since it is known that the maximum number of video channels that can be feasibly carried over moderate distances over telephone wiring pairs under ideal conditions is a small integer, no more than 10, it is impossible to simultaneously transmit on the order of 100 channels to each terminal location by this method, and a means must be provided for remote selection of the transmitted channel or channels by a user at the terminal location controlling a device at the central service location. The telephone wire video transmission system must satisfy all legal and technical requirements governing the broadcasting of RF energy and its injection into the public telephone network, and must not interfere with audio telephone communications or with other devices receiving RE broadcasts on privileged frequency bands, and must tolerate interference from legal broadcasts.

In the most general description of the present invention, a central selector and coupling device responds to commands generated at a terminal location to select a commanded channel from the multiple channel source, and frequency shift the commanded channel onto a band selected for transmission across local telephone wiring. A second device at a terminal location inside a single dwelling or commercial unit possibly effects a second frequency shift to bring this video signal within a frequency range receivable by consumer video equipment. The second device also includes means for transmitting control signals over the telephone wiring to the first, centrally located, device. Two way control communication may also be contemplated, with the central device possibly providing status information to the terminal device, as may provision for the transmission of control signals from the terminal not destined for the central selector device, but for the multiple channel signal provider, as in "two way" cable.

Preferably, the central selector device comprises an array of independent rack mounted units, disposed in a utility location adjacent to a central telephone service location in the structure. These rack mounted devices are paired with units disposed in respective ones of the dwelling or commercial units, these second units being from the consumer's point of view similar in function and appearance to the 'cable box' which, in a typical cable installation, terminates incoming coaxial cable and accepts user input. The functions of the 'box' have in reality been divided between the consumer accessible terminal unit and the utility room installed or rack unit, with added consumer transparent functionality added to permit the intervening transmission of video program information over active phone lines. Functionally, it is as if the cable box had been provided with input and output jacks for phone service, then partitioned with a single wire pair communicating between the parts, this pair carrying both phone and video signals.

Each rack unit, one corresponding to each terminal location, has at least three connection ports. Two ports accept telephone wire pairs or quadruples, typically through RJ-11 plugs. A remaining port accepts a high-bandwidth RF connection, typically a coaxial cable through a BNC connection. Any of these three connections may function as inputs or outputs under some operating conditions, although typically the cable port serves solely as an input, while the telephone ports function bi-directionally. One phone port accepts a line incident from the public phone network, the other connects wiring from the consumer premises. The RF port accepts a high-bandwidth signal from the central video source.

Both rack and terminal units are designed to be transparent to baseband telephone audio signals. The terminal unit has at least two connection ports; a phone port and one video source port, typically RF modulated. It may also have additional phone or RF video ports and baseband audio and video outputs, in addition to a possible light emitting diode (LED) display, and an infrared (IR) 'eye', for the reception of IR control signals from a hand-held controller.

The single required phone port on the terminal unit connects to phone lines via an available wall jack. A second phone port may be provided on the terminal unit to allow connection of telephone equipment at the same wall jack. Alternatively, other wall jacks may provide ordinary phone service, or a splitter may be installed before a phone line enters the terminal unit. The single required video port is connected to a consumer video device, such as a TV or VCR. Other video ports may provide multiple channels, or multiple channels may be output on different frequency bands on the same port, providing such now expected functions as the ability to record one source program while watching another.

In a simplest embodiment, one frequency band is preselected for the transmission of video signals over phone lines, of width sufficient for one channel of video programming. Analogously to the use of VHF channel 3 by VCRs or cable boxes, this frequency band is now used by the rack and terminal units for the relay of the channel of video selected by the user of the terminal location. The user issues a command signal to select this channel by an IR remote. The IR signal is detected by the terminal unit, and the command signal converted to electrical impulses. The command signal is subject to further processing to shift it to a second frequency band set aside for the relay of control signals between the terminal and rack boxes. This second band may be much narrower than the band set aside for video. Upon receipt of the command signal, the rack unit selects the commanded video channel and shifts it to the frequency band set aside for video transmission over phone lines. The terminal receives this signal and, if necessary, converts it to a frequency band capable of reception by a TV or VCR. The second frequency shift may not always be required, since it is a feasible option to transmit video over phone lines in a low VHF channel, which channel would be capable of reception by ordinary consumer video devices. A channel not used for local broadcasting would be selected for this function, which channels are guaranteed to exist in each locality by regulation.

In a more complex embodiment of the present invention, at least two frequency bands would be utilized on each telephone wiring pair for the transmission of at least two channels of video, in accordance with minimum consumer expectations. The less complicated single band system might still find application in institutional settings, for example, hospitals, where no provision need be made for simultaneous recording of video programming. In a multiple band application, the terminal unit would differ in appearance from a normal cable box by the necessary indication of two selected channels, rather than one. Ordinarily additional unscrambled channels may be tuned by 'cable ready' VCR's and TV's from the broadband signal present on the cable. In the present system, since the broadband signal is not available at the individual units or terminal locations, the selection process involving command transmission to the rack mounted selector unit must operate for both, or all, selected channels. The selected channels could be provided at the terminal unit on two VHF channels unused by local broadcasting. Alternatively, or additionally, one channel could be provided on baseband ports suitable for direct connection to the typically unused baseband ports of a VCR. As pointed out by Goodman, numerous advantages accrue by using this mostly ignored capacity of VCR's, and, if the other selected channel is provided to the RF port of a VCR, the ability to watch one channel while recording another is gained by use of the "TV/VCR" switch present on almost all VCR's.

In an alternative embodiment of this invention, instead of concentration at a single central location, rack mounted selector units may be provided in an equipment closet located on each floor of a multiple floor structure. Coaxial cable may then be run in a single vertical riser, and interconnected with the phone lines branching off on each floor. Although some new cable must be run in this case, this has the advantage of limiting additional cable to a single unobtrusive location, without the necessity of entering each dwelling or commercial unit. The equipment closet should of course contain the rising bundle of telephone wires, so that pairs branching off on each floor may be conveniently broken into and a selector unit installed; i.e., wired in series.

In yet another alternative embodiment of the invention, a rack mounted unit at a central equipment closet location also includes circuitry for effecting compression of video signals, such as suggested by the MPEG standards. This circuitry processes the video source channels to reduce the bandwidth requirements. Complementary circuitry in a terminal unit decompresses the video signals, and converts them to a standard recognized by consumer equipment. A compression ratio of 10 is not unreasonable. Therefore, the frequency band from 6–30 MHZ, formerly allowing the transmission of 4×6 MHZ channels may now accommodate 40 channels of source material. Use of nearby empty VHF channels, such as channel 3, can provide an additional 10 channels of program capacity each. Utilizing this embodiment, on the order of 50 channels of video can be simultaneously transmitted over local phone lines, which is a reasonable number of channels to meet consumer expectations of 'cable' service. Accordingly no remote selection means is required under this embodiment, and the resulting system functions more like a now conventional cable distribution network, delivering a full channel selection into the consumer premises, selectable by a decoder 'box'. Until recently the high cost of specialized circuit boards for compression and decompression of video signals in real time with requisite quality would have made such a method impracticable for mass consumer applications. However, in consequence of the continued near-exponential growth of generic processing power at fixed cost, and experience gained with video compression technologies, this cost barrier to commercial practicality of a particular embodiment of the present invention may soon fall.

DETAILED DESCRIPTION OF THE INVENTION

For simplicity in what follows, a partially process oriented description will be adopted, in which a general direction of signal flow suggests an implicit fictitious temporal ordering in the description of static structural relations between system components. It will be readily comprehended that such a description comprises information on the structural, functional and methodic elements of the instant invention, without the necessity of independent description thereof.

Figure 1:
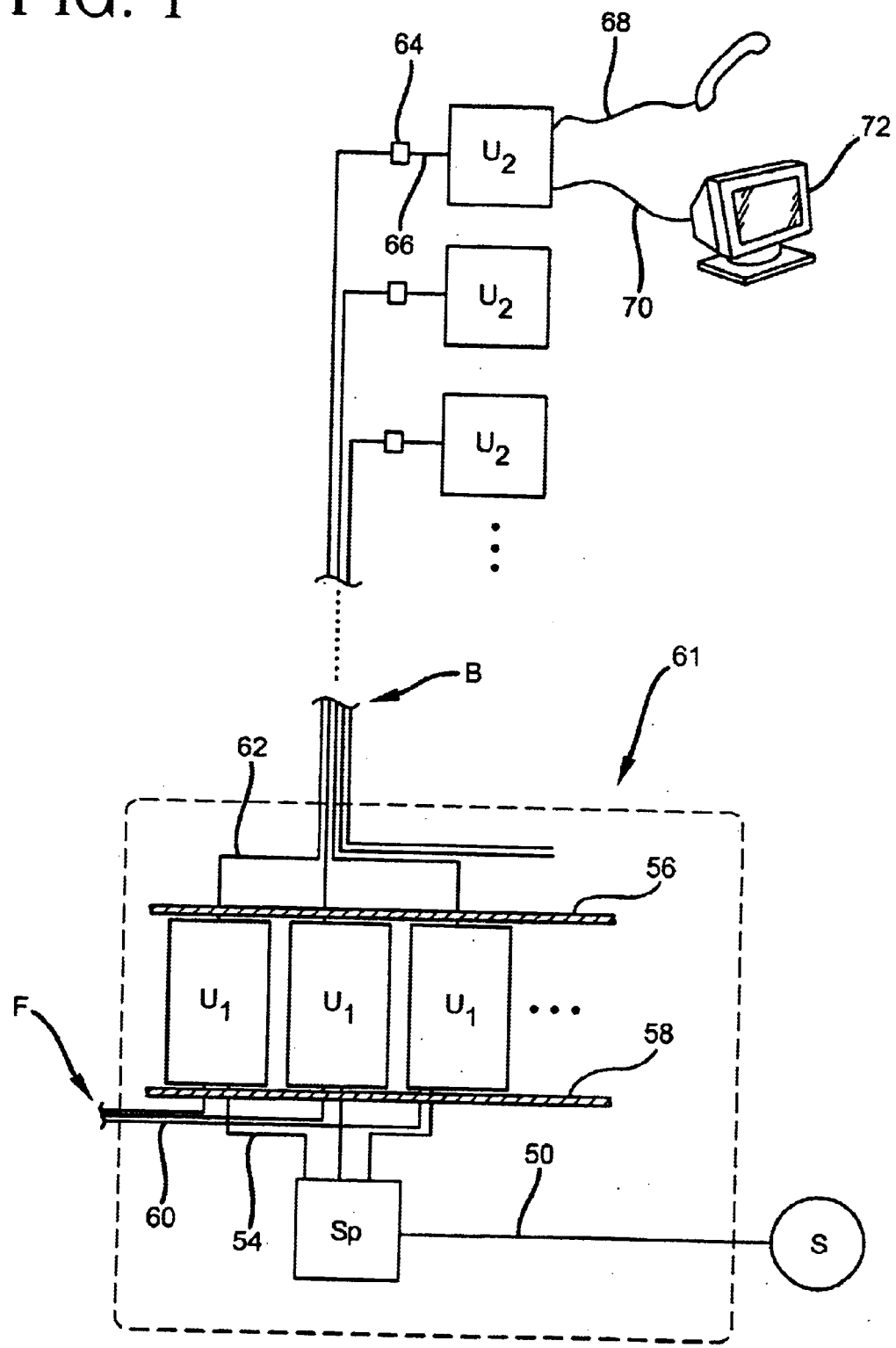
FIG. 1 is partially a functional block diagram and partially a schematic illustration of a system for the distribution of video signals in accordance with the present invention.

In a first system for the distribution of video program information over subscriber telephone lines, a source or central distribution node S delivers a multiple channel feed into consumer or commercial premises via inside feeder cable 50 (FIG. 1). Source S may comprise an antenna, such as a satellite dish antenna (not illustrated), and related electronics, or a buried coaxial cable (not illustrated). Cable 50 terminates in a splitter Sp, which provides the signal present on cable 50 to a multiplicity of distributor cables 54. Cables 54 terminate respectively in a plurality of rack mounted transponder or signal processing units $U_1$, shown schematically mounted on rack elements 56 and 58. Telephone feed bundle F enters a consumer or commercial premises from a telephone exchange (not illustrated) in general external to the consumer or commercial premises and forks into a multiplicity of subscriber lines 60. In general, subscriber lines 60 terminate, in a pre-existing configuration, in a telephone junction box 61. Subsequent to installation of the video distribution system, subscriber lines 60 effectively terminate in respective rack-mounted units $U_1$. Interrupted subscriber lines 60 reemerge from units $U_1$ as continued subscriber lines 62, gathered in a bundle B before diverging to respective subscriber premises. Lines 62 constitute the existing installed telephone network in a building structure, and may take the form of twisted pairs, i.e., unshielded pairs of insulated conductors twined about each other in order to partially cancel emitted fields and minimize radiation. For the purposes of this disclosure, 'twisted pair' will be taken to describe ordinary unshielded telephone wiring, whether or not actually twisted. Subscriber lines 62 terminate in jack boxes 64, located on subscriber premises, into which are inserted respectively twisted pair lead lines 66 from terminal transponder or signal processing units $U_2$. One or more terminal units $U_2$ are disposed in each respective consumer premises, and from a subscriber or end-user vantage point, constitute a video channel selector. Subscriber lines 62 may branch into a multiplicity of jacks 64 in respective premises, not all of which need be connected to terminal units $U_2$ (not illustrated). Units $U_2$ provide output connections for a video cable 70, terminating in consumer video product 72, and telephone handset line cord 68.

Figure 2:
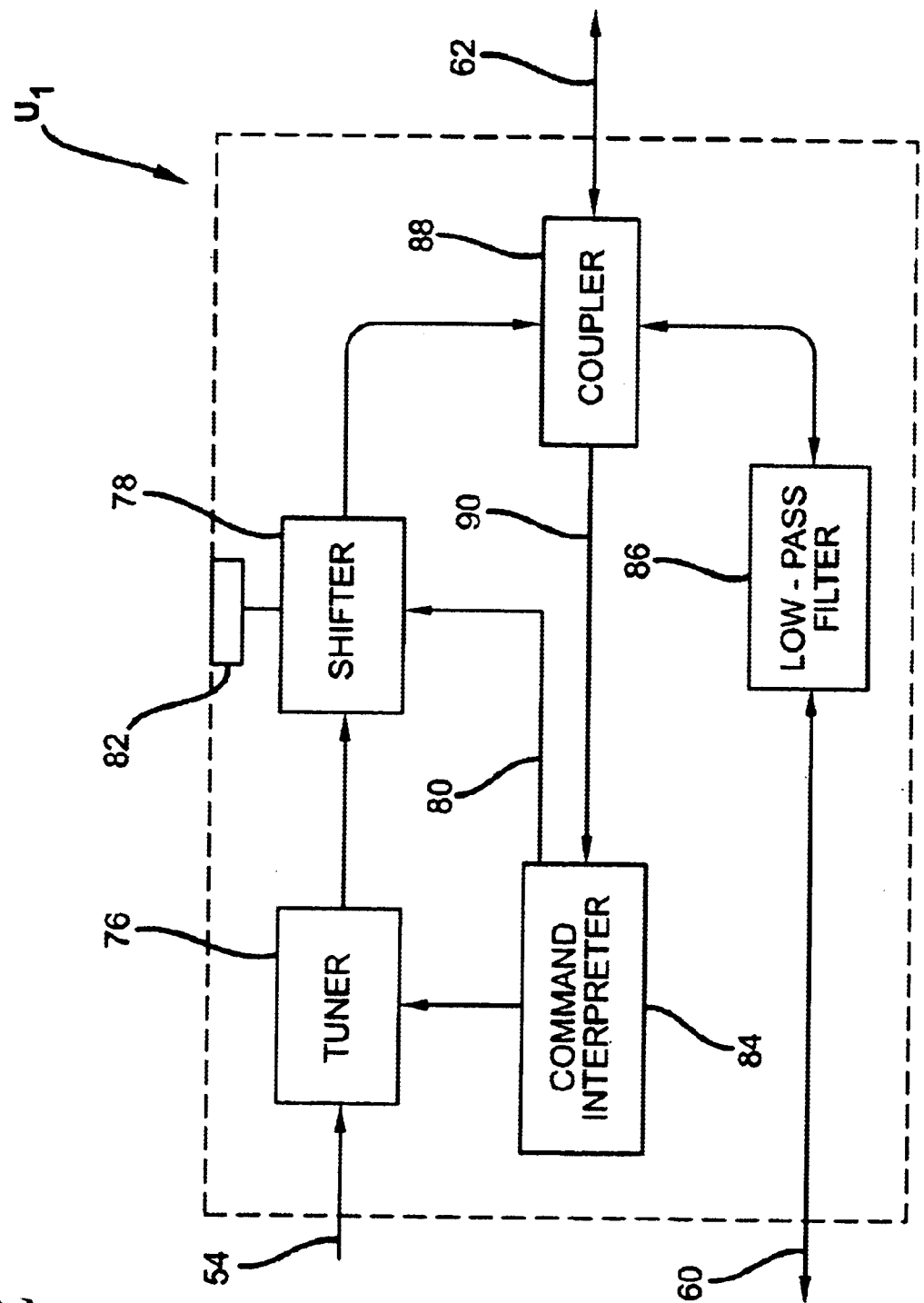
FIG. 2 is a functional block diagram of a transponder unit, primarily a transmitter, used in the system of FIG. 1 in accordance with the present invention.

A representative rack mounted unit $U_1$ is illustrated in greater detail in FIG. 2. It is to be noted that the functions of independent units $U_1$ may be alternatively performed by a single physical unit with multiple connection ports. The processes of such a single unit would be accomplished either by parallel or sequential processing according to the suitability of each respective task for parallel or sequential implementation, as well understood by those skilled in the art. For example, tuner and frequency shift functions, as described below, may be most feasibly implemented by a multiplicity of tuner or frequency shifter boards, while command interpretation may be handled by a signal central processor provided with a command queue. These and other equivalent assignments of the functionality disclosed herein may be made by the person skilled in the electronic arts without departing from the spirit of the disclosed invention.

In a preferred embodiment as illustrated by FIG. 2, distributor cable or source line 54 feeds a tuner or video signal extraction component 76, which selects a single channel of video information. Tuner 76 is operatively connected to shifter or modulator 78. The shifter in general shifts the video signal output by the tuner to a pre-selected available frequency band for transmission on continued subscriber line 62. In the case where tuner 76 provides a base-band video signal as an output, shifter 78 will literally take the form of a radio frequency modulator. The exact placement of a conceptual boundary between block functional circuits 76 and 78 is not a crucial feature of the present invention, nor is the precise format of a signal crossing this boundary. 'Modulator' and 'demodulator' in the context of the present invention may be taken to mean circuitry respectively placing a video program signal output by tuner or selector 76 in condition for transmission on subscriber phone lines 62, and placing the signal transmitted over phone lines 62 in condition for reception by consumer video equipment.

An output frequency band of shifter or modulator 78 may be chosen by position of set-switch 82 as set by an installing technician cognizant of specific local conditions, or dynamically adjusted in response to signals output by command interpreter or decoder 84. Subscriber phone line 60 is connected to coupler 88 via low-pass filter 86, which filter serves to protect the public telephone network from injection of RE energy. Because limits on RE injection into the public telephone network are considerably more severe below 6 MHZ, filter 86 may not be required if shifted video and control signals imposed on continued subscriber line 62 are confined to frequencies higher than 6 MHZ. Coupler 88 serves to combine incident video signals from shifter 78 and incoming voice signals from subscriber phone line 60 and transmit the combined signal along continued subscriber phone line 62. Coupler 88 also relays audio or voice signals and controls signals transmitted from a subscriber termination of line 62. Control signals are advantageously transmitted from a subscriber terminal of line 62 encoded in a frequency band centered on 10.7 MHZ, as described in the prior art. Control signals are relayed from coupler 88 to a command interpreter 84 which decodes the incoming control signals and issues a command to tuner 76 for determining channel selection, and optionally issues an instruction to shifter 78 to determine frequency band selection. Audio band signals incident on coupler 88 from a subscriber end of line 62 are transmitted via low-pass filter 86 to subscriber phone line 60, whereupon these audio band signals are accepted and processed in the normal way by the local area public phone network.

Figure 3:
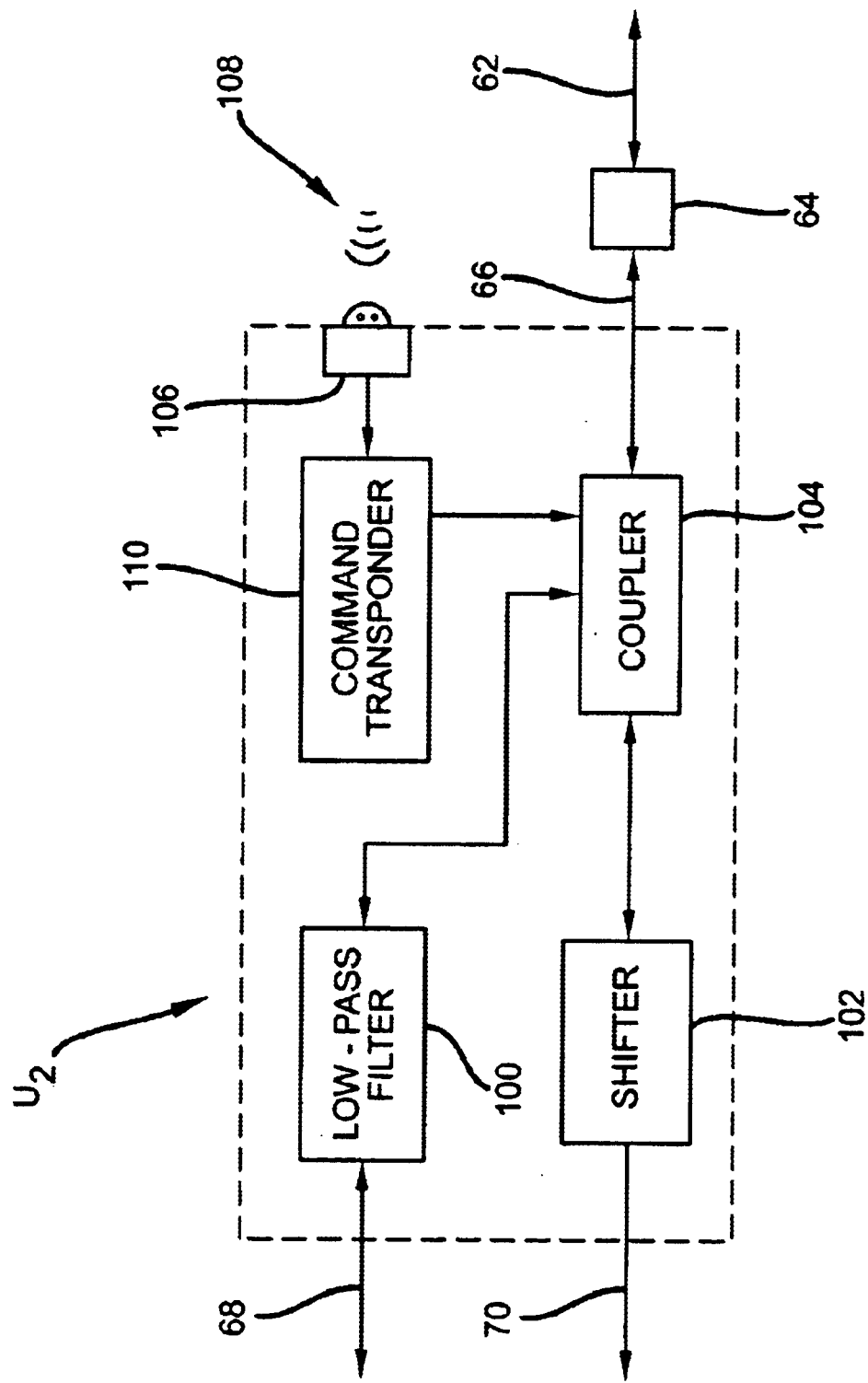
FIG. 3 is a block functional diagram of a second transponder unit, primarily a receiver, used in the system of FIG. 1 in accordance with the present invention.

Terminal unit $U_2$ is represented in greater detail in FIG. 3. As discussed above with reference to FIG. 1, unit $U_2$ is provided with input 66 and outputs 68 and 70. Input 66 connects via a twisted pair (not separately designated) to telephone wall jack 64 connected to a respective subscriber telephone line 62. Output 68 provides audio band signals for connection to subscriber telephone equipment 92 (FIG. 1) and output 70 provides a video signal for connection to subscriber video equipment 72 (FIG. 1). A low-pass filter 100 serves to isolate subscriber telephone equipment 92 from RF signals and also limit RF attenuation by telephone equipment components. A shifter or demodulator 102 at least partially reverses a function of shifter 84, restoring or first creating, from video program information present on line 62 and transmitted through a coupler 104, a video signal in a frequency range receivable by consumer equipment. In an additional function of terminal unit or module $U_2$, infrared encoded channel selection commands transmitted from a hand-held controller (not illustrated) and schematically represented by a wave-train 108 are received and converted to electrical impulses by a transducer 106. A command transponder or command signal generator 110 amplifies these impulses and generates a channel selection signal in a frequency band ideally centered on 10.7 MHZ, as previously discussed. These frequency shifted control signals are combined with audio signals by coupler 104 and transmitted via output 70 and wall jack 64 on continued subscriber telephone line 62 from which the frequency shifted control signals are incident on a respective rack mounted unit $U_1$ and serve to control functions of tuner 76 and shifter 78, as discussed above.

In the operation, terminal unit $U_2$ and rack mounted unit $U_1$ cooperate to allow remote consumer selection of a program source from a multiplicity of program sources present on feed cable 50, for transmission in a fixed frequency band on limited-bandwidth subscriber telephone line 62.

In a second system for the distribution of video program information over subscriber telephone lines, described in detail below, a small integral number of program sources greater than one are simultaneously selected for co-transmission over telephone line 62. A means of achieving this function is illustrated in FIG. 5 and FIG. 6, which show modified centrally located signal processing units $U_1'$ and modified terminal units $U_2'$, respectively.

Figure 5:
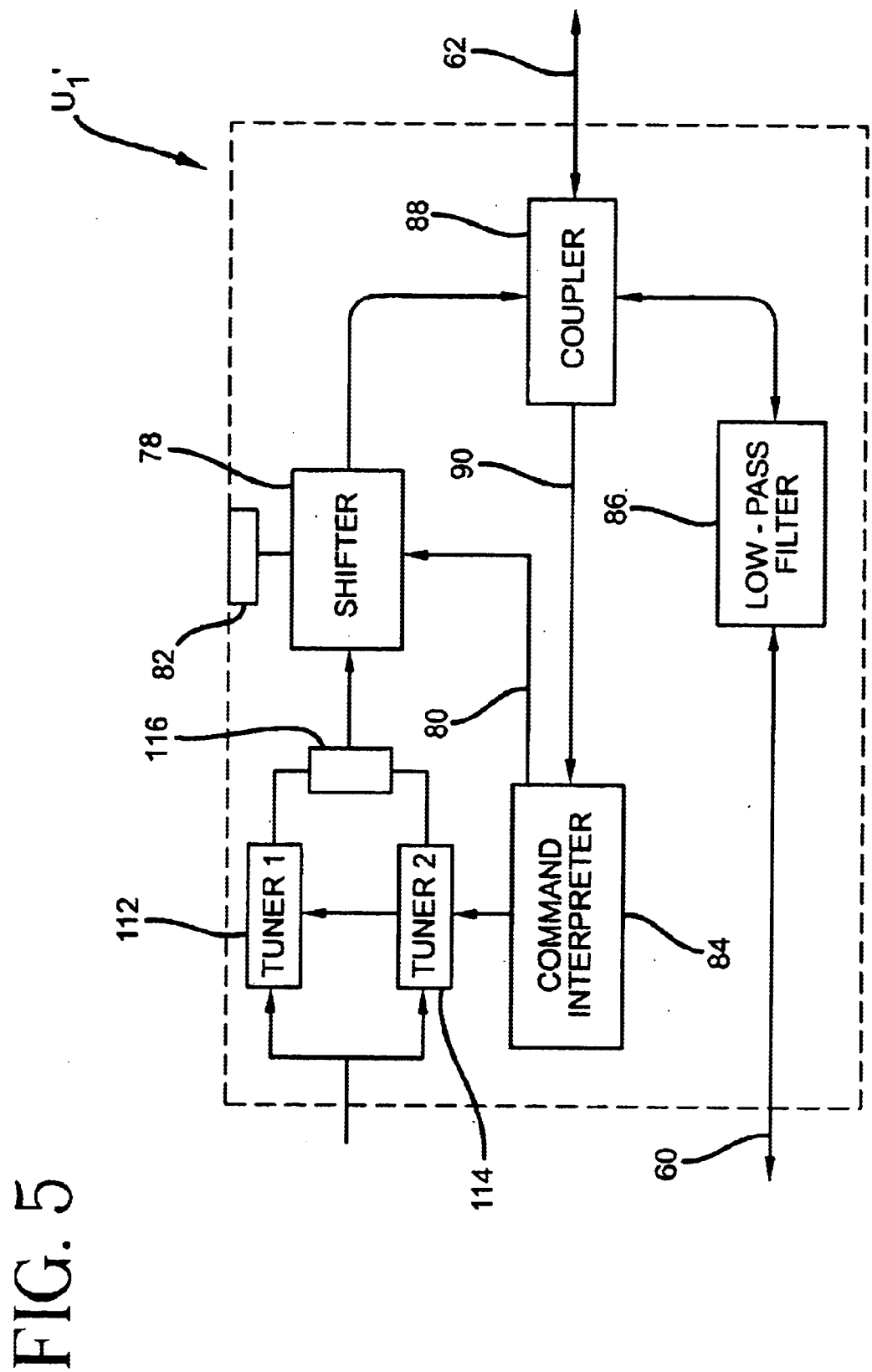
FIG. 5 is a functional block diagram of a transponder unit which is a modification of the transponder unit illustrated in FIG. 2.
Figure 6:
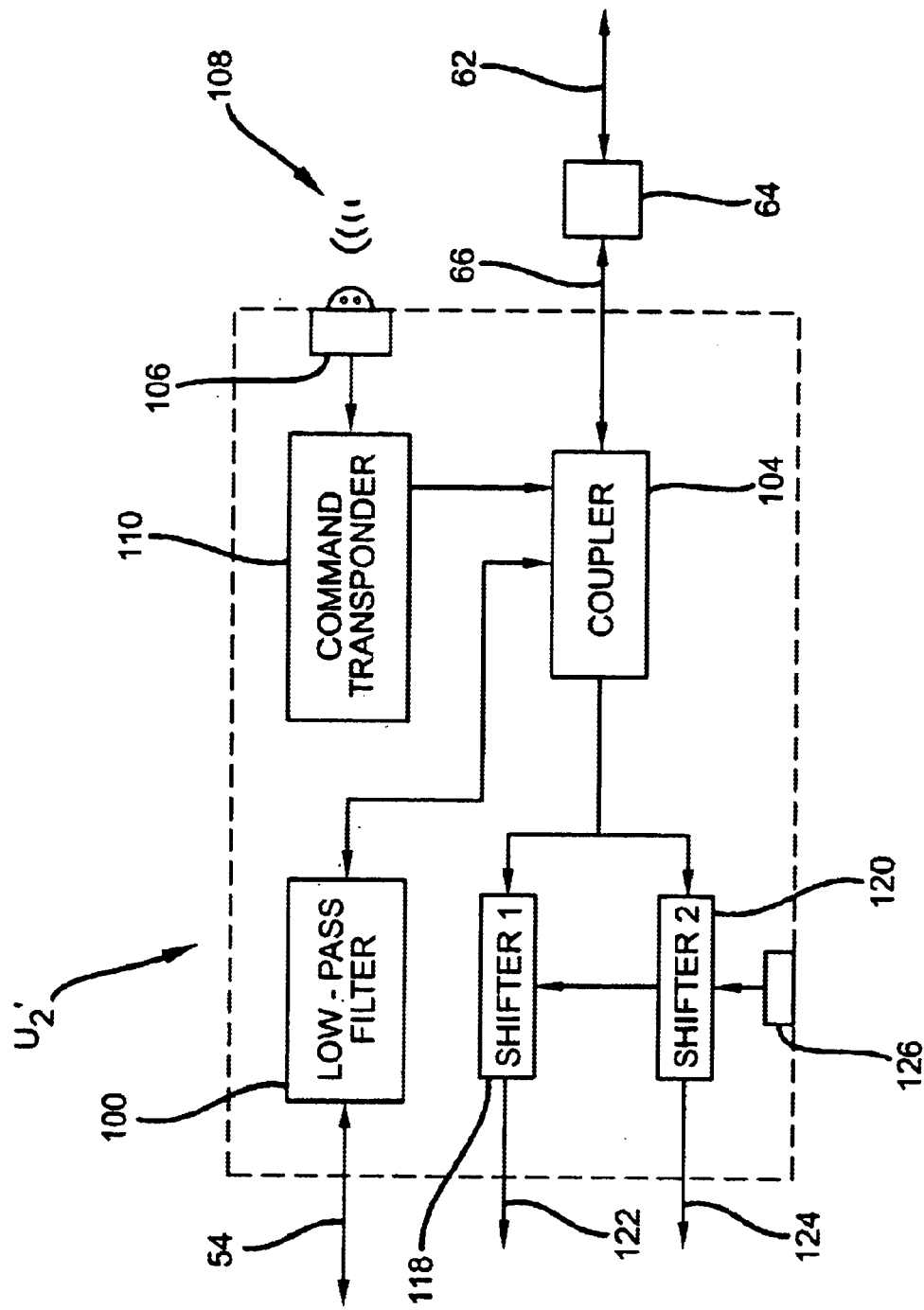
FIG. 6 is a functional block diagram of a transponder unit which is a modification of the transponder unit illustrated in FIG. 3.

In the device illustrated in FIG. 5, dual tuners 112 and 114 replace single tuner 76. Responding to commands transmitted by command interpreter 84, tuners 112 and 114 select and tune respective program sources or channels from distributor cable or source line 54, outputting tuned channel signals in distinct frequency bands. Output signals are mixed or combined in a second coupler 116, from whence they are transmitted to shifter 78. Shifter 78 simultaneously shifts output signals from tuners 112 and 114 in parallel, thereby transmitting these signals in distinct frequency bands on continued subscriber line 62 via coupler 88. In a terminal unit $U_2'$ (FIG. 6) with modifications corresponding to those of $U_1'$, a single shifter 102 (FIG. 3) is replaced by dual shifters 118 and 120. Shifters 118 and 120 shift video signals present on subscriber phone line 62 generally by differing amounts, thereby making these signals available at shielded outputs 122 and 124 in a form convenient for consumer use, typically in the same locally unused television channel 3 or 4. Switch set 126 permits consumer selection of the output channel of shifters 118 and 120 according to local requirements.

Figure 4:
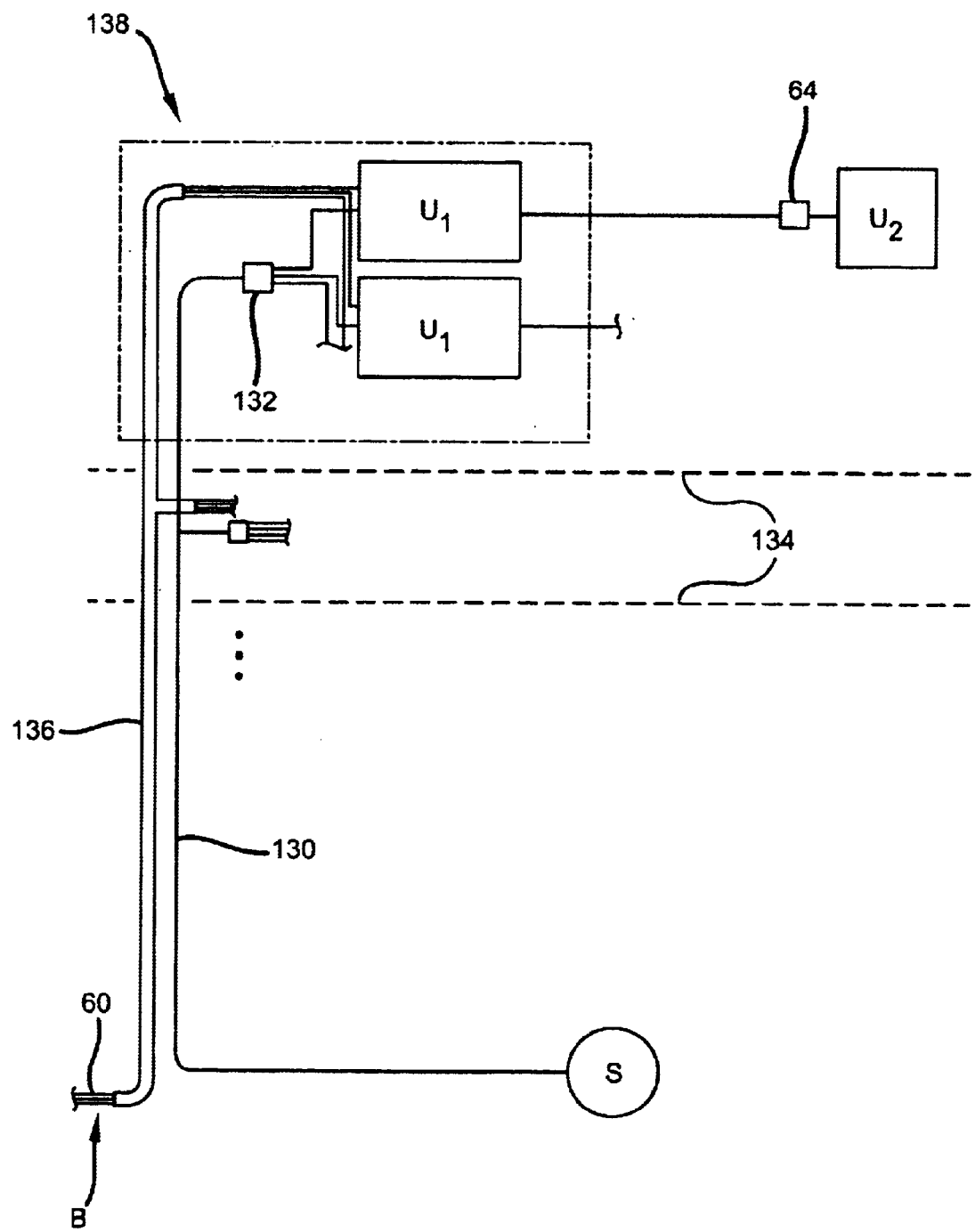
FIG. 4 is partially a functional block diagram and partially a schematic of an alternate architecture for a video distribution system in accordance with the present invention.

In yet another embodiment of the present invention (FIG. 4), an alternative network architecture shifts the location of an interface between video feed and telephone equipment. In this alternative, source S feeds a single riser or common cable 130. Common cable 130 feeds junction boxes or splitters 132 located on each floor of a served structure, horizontal structural partitions being schematically represented by dashed lines 134. It is contemplated in this embodiment that cable 130 shares a common plenum with telephone line riser or conduit 136, and that junction boxes 132 are located in telephone service closets, schematically illustrated by dot-dash enclosure 138, disposed on respective floors of the multiple-unit dwelling or commercial structure. Bundle B of consumer telephone lines 60 enters conduit 136 from a central service location as installed by the telephone company. The network of FIG. 4 is functionally identical to that illustrated in FIG. 1 but shifts the junction between telephone system and video feed to a location closer to the subscriber premises or dwelling unit. This shift in location minimizes the length of unshielded telephone wire conductors used for non-design RF signal transmission at the cost of running a single common video cable in a vertical service plenum, while maintaining the advantage of eliminating floor by floor wiring for video cable reception.

In yet another video signal distribution system, modified rack mounted units remain installed in a central building service location, but the necessity of remote channel selection from a consumer or subscriber premises is eliminated by the use of video compression technology. Referring again to FIG. 1, rack mounted unit $U_1$ may be modified to include specialized or generic integrated circuits modified by programming to effect a compression of the incoming multichannel video signal supplied by source S. Terminal unit $U_2$ is modified to include corresponding circuitry in order to effect a decompression of the incident signal.

Figure 7:
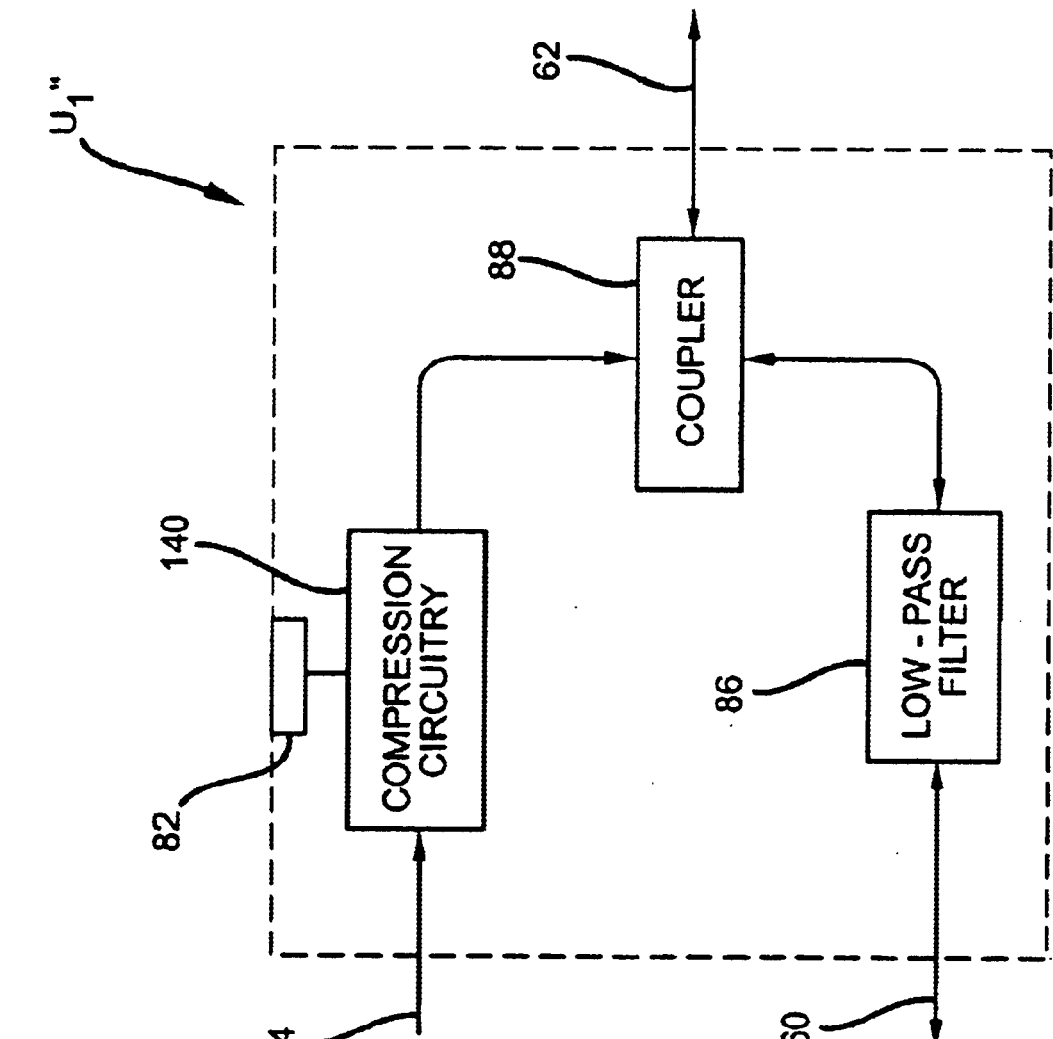
FIG. 7 is a functional block diagram of a transponder unit which is a further modification of the transponder unit illustrated in FIG. 2.
Figure 8:
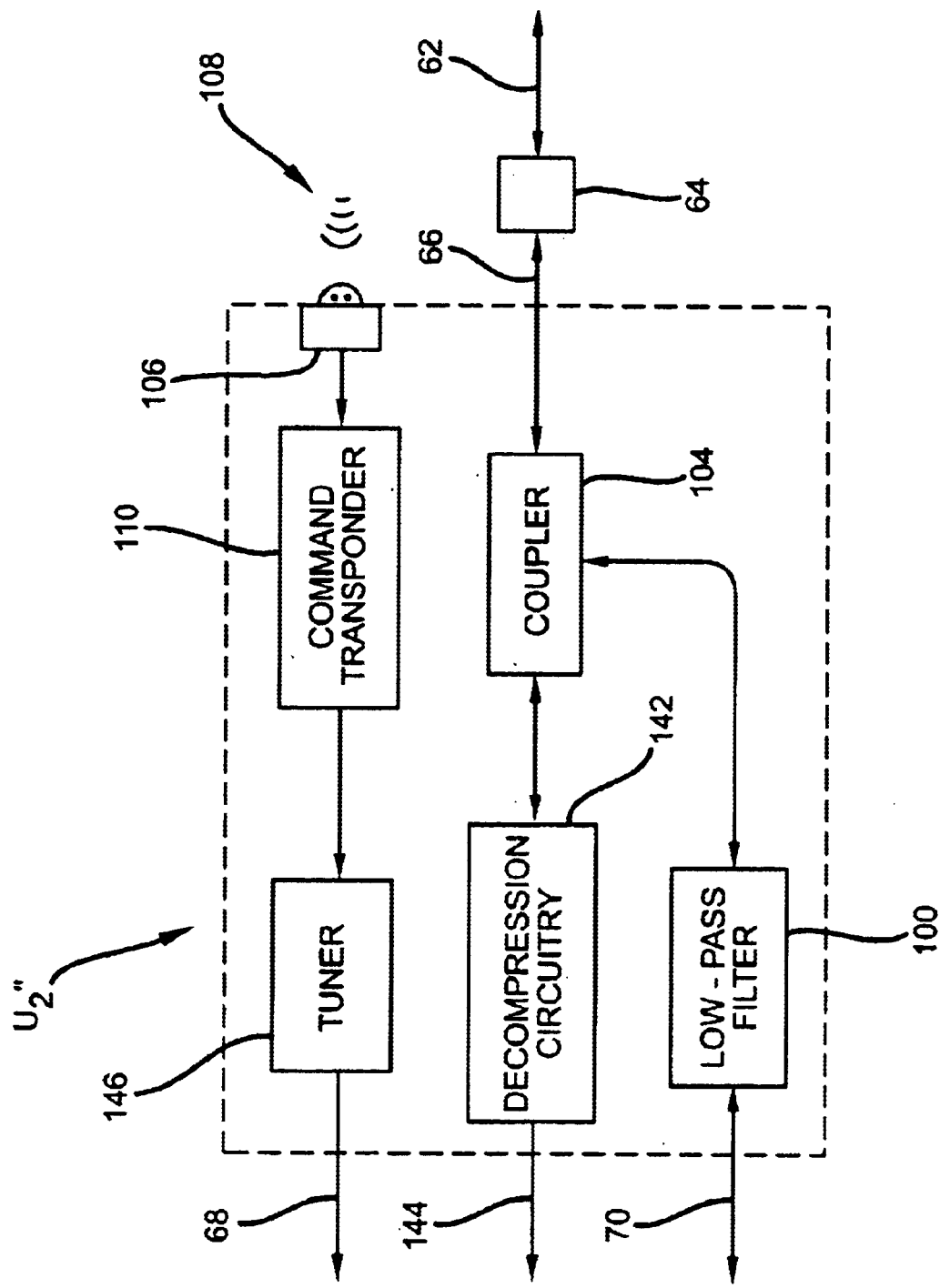
FIG. 8 is a functional block diagram of a transponder unit which is a further modification of the transponder unit illustrated in FIG. 3.

A better explication of this embodiment may be achieved by a comparison of FIGS. 7 and 8 with FIGS. 2 and 3. In modified rack mounted unit $U_1''$, tuner 76 and shifter 78 are now eliminated in favor of a single block functional circuit component 140 for execution of a video compression algorithm (FIG. 7). Output of compression circuitry 140 may by design be taken to lie in an RF band suitable for transmission on subscriber telephone lines, typically between 6 MHZ and 30 MHZ, possibly also comprising one or more available nearby low VHF channels unused in local broadcasting. In this manner on the order of 50 channels of video programming may be simultaneously transmitted over subscriber telephone lines for distances found in a multiple dwelling unit or commercial structure of moderate size, up to approximately 250 feet of signal transmission. The need for command interpreter 84 is accordingly eliminated in the centrally located unit $U_1''$, as there is no need to choose one or two channels to be transmitted over the limited bandwidth available on an unshielded wire pair. Set switch 82 is retained, however, to allow one time adjustment by the installing technician of the frequency band or bands to be utilized for transmission of video signals over phone lines, according to local conditions. Setting switch 82 may, for example, select either VHF channel 3 or channel 4 as an auxiliary carrier band, in addition to available sub-VHF frequency bands.

Modified terminal or subscriber unit $U_2''$ eliminates shifter 102 in favor of decompression circuitry 142. Circuitry 142 provides a broadband output 144 suitable for utilization by 'cable ready' consumer products. A tuner 146 is also provided for provision of a selected channel on a fixed frequency band, for example, on VHF channel 3, providing functionality similar to a typical cable 'box'. 'Tuners' as described in all embodiment of the present invention are functionally similar to 'shifters', but differ in nomenclature since tuners also embody a selection function and a variable frequency shift, dependent on the frequency of the input signal of the selected channel, while shiftes in the context of the present invention perform an indiscriminate fixed frequency shift of all incident signals. Audio band telephone line output 70 is also provided as in previous embodiments, through a low pass filter 100 connected to coupler 104.

One of ordinary skill in the art will appreciate that the various signal processing units, distribution schemes and network architectures may be modified to form further, equivalent signal processing units, distribution schemes and network architectures. For instance, the rack mounted and terminal units of FIGS. 7 and 8, comprising signal compression means, could be combined with the network architecture of FIG. 4 by placing the rack mounted units on each floor rather than in a single central location.

Accordingly, it is to be understood that the drawings and descriptions herein are proffered by way of example to facilitate comprehension of the invention and should not be construed to limit the scope thereof.

What is claimed is:

1. A method of distributing video and data signals in a multiple unit dwelling, the multiple unit dwelling having a telephone network, the telephone network including multiple twisted-pair conductors extending from respective dwelling units to a telephone junction box, the telephone junction box coupling the twisted-pair wires to a telephone exchange, the method comprising the steps of:

receiving a plurality of video/data signals;

coupling the plurality of video/data signals to the telephone junction box;

transmitting the plurality of video/data signals over the twisted-pair conductors to at least one of the dwelling units; and extracting at least one of the plurality of video/data signals from the transmitted plurality of video/data signals in proximity to the at least one of the plurality of dwelling units in response to a channel selection signal.

2. A method defined in claim 1, wherein the step of transmitting the plurality of video/data signals further includes the steps of:

compressing the plurality of video/data signals prior to transmitting the plurality of video/data signals over the twisted-pair conductors; and decompressing the compressed plurality of video/data signals subsequent to transmitting the plurality of video/data signals over the twisted-pair conductors.

3. A method defined in claim 1, wherein the plurality of video/data signals include at least one of video content and a data signal.

4. A video and data signal distribution system for use in a multiple unit dwelling, the multiple unit dwelling having a telephone network, the telephone network including multiple twisted-pair conductors extending from respective dwelling units to a telephone junction box, the telephone junction box coupling the twisted-pair conductors to a telephone exchange, the system comprising:

a receiver, the receiver being able to receive a plurality of video/data signals, the receiver being coupled to the twisted-pair conductors, the receiver being able to transmit the received plurality of video/data signals on the twisted pair conductors;

a plurality of video/data channel selectors, each of the plurality of video/data channel selectors being disposed in a dwelling unit, each of the plurality of video/data channel selectors being operatively coupled to at least one of the twisted-pair conductors, each of the plurality of video/data channel selectors being able to generate a channel selection signal in response to a user input; and a video/data signal extraction component, the video/data signal extraction component being associated with a respective video channel selector, the video/data signal extraction component being operatively coupled to at least one of the twisted-pair conductors, the video/data signal extraction component being able to extract a selected video/data signal from the received plurality of video/data signals in response to the channel selection signal.

5. A video and data signal distribution system as defined in claim 4, wherein the receiver further includes a video/data compression circuit, the video/data compression circuit compressing the plurality of video/data signals prior to transmitting the received plurality of video/data signals on the twisted-pair conductors.

6. A video and data signal distribution system as defined in claim 4, wherein the video/data signal extraction component further includes a video/data decompression circuit, the video/data decompression circuit decompressing the compressed plurality of video/data signals subsequent to transmitting the received plurality of video/data signal on the twisted-pair conductors.

7. A video and data signal distribution system as defined in claim 4, wherein the receiver includes a coaxial cable, the coaxial cable conducting the plurality of video/data signals from a video/data signal source.

8. A video and data signal distribution system as defined in claim 4, wherein the receiver includes a satellite antenna, the satellite antenna receiving the plurality of video/data signals from a video/data signal source.

9. A video and data signal distribution system as defined in claim 4, wherein at least one of the receiver and the plurality of video/data channel selectors includes at least one of a low-pass filter and a high-pass filter, at least one of the low-pass filter and the high-pass filter substantially isolating the plurality of video/data signals from the telephone signals.

10. The video and data signal distribution system defined in claim 4, wherein the plurality of video/data signals include at least one of video content and a data signal.

* * * * *